United States Patent
Thurfjell et al.

(10) Patent No.: US 11,223,412 B2
(45) Date of Patent: Jan. 11, 2022

(54) RADIO NODE AND METHODS IN A WIRELESS COMMUNICATIONS NETWORK

(71) Applicant: Telefonaktiebolaget LM Ericsson (publ), Stockholm (SE)

(72) Inventors: Magnus Thurfjell, Luleå (SE); Arne Simonsson, Gammelstad (SE); Kjell Larsson, Luleå (SE); Peter Ökvist, Luleå (SE); Jan Roger Sakari Pirinen, Espoo (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/972,149

(22) PCT Filed: Jun. 4, 2018

(86) PCT No.: PCT/SE2018/050572
§ 371 (c)(1),
(2) Date: Dec. 4, 2020

(87) PCT Pub. No.: WO2019/235979
PCT Pub. Date: Dec. 12, 2019

(65) Prior Publication Data
US 2021/0242921 A1   Aug. 5, 2021

(51) Int. Cl.
*H04B 7/06* (2006.01)
*H04B 7/0456* (2017.01)

(52) U.S. Cl.
CPC ......... *H04B 7/0695* (2013.01); *H04B 7/0486* (2013.01); *H04B 7/0617* (2013.01)

(58) Field of Classification Search
CPC .. H04B 7/0695; H04B 7/0617; H04B 7/0486; H04B 7/0697
See application file for complete search history.

(56) References Cited

U.S. PATENT DOCUMENTS 9,882,622 B2 *   1/2018   Jeong ................... H04B 7/0857
10,368,373 B2 *  7/2019   Nagaraja .............. H04B 7/0695
(Continued)

FOREIGN PATENT DOCUMENTS

WO   2018/217144 A1   11/2018

OTHER PUBLICATIONS

International Search Report and Written Opinion issued in International Application No. PCT/SE2018/050572 dated Feb. 5, 2019 (13 pages).

*Primary Examiner* — Kenneth T Lam
(74) *Attorney, Agent, or Firm* — Rothwell, Figg, Ernst & Manbeck, P.C.

(57) ABSTRACT

A method performed by a radio node for increasing a throughput of a MIMO channel. The radio node operates in a wireless communication network 100. The beams are beamformed at a transmitter of the radio node. The beams comprise: A first beam comprising a first beam gain in a first direction, and at least one second beam wherein each at least one second beam comprises a respective second beam gain in a respective second direction. When decided that the signal strength on the first beam is a first threshold stronger than the signal strength on each respective at least one second beam, and the signal strength on the at least one second beam is above a second threshold, the radio node increasing the throughput of the MIMO channel by suppressing (302) the first beam with respect to its beam gain.

11 Claims, 9 Drawing Sheets

---

301. Decide that signal strength on first beam is a first threshold stronger than the signal strength on second beams, and that signal strength on second beam(s) is above a second threshold.

↓

302. Increase throughput of MIMO channel by suppressing first beam with respect to its beam gain.

↓

303. Perform the transmission over the MIMO channel with the increased the throughput.

(56) References Cited

U.S. PATENT DOCUMENTS

| | | |
|---|---|---|
| 2013/0064129 A1 | 3/2013 | Koivisto et al. |
| 2016/0285660 A1* | 9/2016 | Frenne ................. H04B 7/0626 |
| 2017/0117950 A1* | 4/2017 | Strong ................. H04B 7/0452 |
| 2017/0207845 A1* | 7/2017 | Moon ................... H04B 7/0695 |
| 2018/0048375 A1* | 2/2018 | Guo ....................... H04B 7/024 |
| 2018/0199226 A1* | 7/2018 | Tsai ...................... H04W 24/10 |
| 2018/0351605 A1* | 12/2018 | Liang .................... H04B 7/0417 |
| 2019/0081688 A1* | 3/2019 | Deenoo ................. H04B 7/088 |

* cited by examiner

RADIO NODE AND METHODS IN A WIRELESS COMMUNICATIONS NETWORK

CROSS REFERENCE TO RELATED APPLICATION(S)

This application is a 35 U.S.C. § 371 National Stage of International Patent Application No. PCT/SE2018/050572, filed Jun. 4, 2018, designating the United States.

TECHNICAL FIELD

Embodiments herein relate to a radio node in a wireless communications network, and a method therein. In particular, they relate to increasing the throughput of a MIMO channel.

BACKGROUND

In a typical wireless communication network, wireless devices, also known as radio nodes, wireless communication devices, mobile stations, stations (STA) and/or User Equipments (UE), communicate via a Local Area Network such as a WiFi network or a Radio Access Network (RAN) to one or more core networks (CN). The RAN covers a geographical area which is divided into service areas or cell areas, which may also be referred to as a beam or a beam group, with each service area or cell area being served by a radio node also referred to as a radio network node such as a radio access network node e.g., a Wi-Fi access point or a radio base station (RBS), which in some networks may also be denoted, for example, a NodeB, eNodeB (eNB), or gNB as denoted in 5th Generation (5G). A service area or cell area is a geographical area where radio coverage is provided by the radio network node. The radio network node communicates over an air interface operating on radio frequencies with the wireless device within range of the radio network node. The radio network node communicates to the wireless device in DownLink (DL) and from the wireless device in UpLink (UL). The wireless devices communicate to each other in SideLink (SL).

Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network also referred to as 5G New Radio (NR) and to continuously evolve 4G. The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs used in 3rd Generation (3G) networks. In general, in E-UTRAN/LTE the functions of a 3G RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

In addition to faster peak Internet connection speeds, 5G planning aims at higher capacity than current 4G, allowing higher number of mobile broadband users per area unit, and allowing consumption of higher or unlimited data quantities in gigabyte per month and user. This would make it feasible for a large portion of the population to stream high-definition media many hours per day with their mobile devices, when out of reach of Wi-Fi hotspots. 5G research and development also aims at improved support of machine to machine communication, also known as the Internet of Things, aiming at lower cost, lower battery consumption and lower latency than 4G equipment.

Multi-antenna techniques can significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO.

A communication channel between a transmitter and a receiver typically comprises of multiple different paths. The different paths are either Line-of-Sight (LoS), diffracted around, or reflected on objects in the environment. These paths will differ in direction and/or strength.

With beamforming at transmission, an adaption to the different path directions is made to optimize the transmitted energy. A beam when used herein means a transmit direction with higher antenna array gain than the surrounding directions.

Beamforming when used herein means the method of making a beam, typically by phase and amplitude adjustment of the antenna elements making up an antenna array.

With reciprocity based (see explanation below) digital beamforming, optimal power and directions of transmitted beams may be formed. Eigen beamforming or conjugate beamforming adapts the strength of the optimal beams relatively the paths strength utilizing all paths in all directions optimal. Path strength when used herein means the channel gain in the spatial directions of the path from the antenna array. Singular Value Decomposition (SVD) beamforming forms multidirectional beams with multi-layer optimal orthogonality. A singular value when used herein means the mathematical singular value calculated from the channel matrix, i.e. the matrix of the channels between all transmitter and all receiver antennas.

Digital beamforming requires more complex hardware and may be costly. With analog beamforming the number of beam directions per time instance is limited by number of radio chains. It is not yet clear if full digital beamforming will be feasible to implement in terminals, but the smaller amount of antenna elements that is used the easier it should be. For a Customer Premises Equipment (CPE) device, the power will be a smaller issue than for a hand-held terminal. By this it might be feasible for at least some terminals to utilized full digital beamforming. A CPE device refers to a telecommunications hardware device located on a telecommunication customer's premises. It may include cable or satellite television set-top boxes, DSL or other broadband Internet routers, VoIP base stations, telephone handsets, or other customized hardware.

Reciprocity based beamforming is based on the principle of channel reciprocity which states that the channel is equal in both directions. I.e. the channel measured in a network node from a transmitting UE is assumed to be the same as if instead the network node transmits to the UE. It means that it is possible to measure a receive channel and use the channel information when transmitting. No channel measurement reporting carrying reduced channel information between nodes needed. This generally results in very good channel knowledge and channel estimation. Reciprocity assumption means that the channel only needs to be characterized in one direction.

Eigen beamforming does not take spatial multiplexing into account and does not optimize throughput including rank. Spatial multiplexing is a transmission technique in MIMO wireless communication to transmit independent and separately encoded data signals, so-called streams, over the multiple transmit antennas. Therefore, the space dimension is reused, or multiplexed, more than one time.

SVD beamforming is optimal in theory but is in practice limited by noise and channel estimation. For example, when a singular value ratio is high the weakest layers will not be efficiently estimated, received and decoded. This may be the case in LoS with a direct path much stronger than other reflected paths.

A singular value when used herein means the equivalent signal strength of a layer.

A singular value ratio when used herein means the ratio between two singular values.

SUMMARY

An object of embodiments herein is to improve the performance of a wireless communications network using beamforming.

According to a first aspect of embodiments herein, the object is achieved by a method performed by a radio node for increasing a throughput of a MIMO channel. The radio node operates in a wireless communication network 100. Beams are beamformed at a transmitter of the radio node. The beams comprise:

A first beam comprising a first beam gain in a first direction, and at least one second beam wherein each at least one second beam comprises a respective second beam gain in a respective second direction.

When decided that the signal strength on the first beam is a first threshold stronger than the signal strength on each respective at least one second beam, and the signal strength on the at least one second beam is above a second threshold, the radio node increasing the throughput of the MIMO channel by suppressing the first beam with respect to its beam gain.

A beam gain when used herein means the gain of a beam compared to a reference with no beam, e.g. omnidirectional antennas or the antenna pattern of single antenna element etc.

According to a second aspect of embodiments herein, the object is achieved by a radio node for increasing a throughput of a MIMO channel. The radio node is operable in a wireless communication network. The beams are to be beamformed at a transmitter of the radio node. The beams are adapted to comprise: A first beam adapted to comprise a first beam gain in a first direction, and at least one second beam, wherein each at least one second beam is adapted to comprise a respective second beam gain in a respective second direction. The radio node is configured to:

When decided that the signal strength on the first beam is a first threshold stronger than the signal strength on each respective at least one second beam, and the signal strength on the at least one second beam is above a second threshold, increase the throughput of the MIMO channel by suppressing the first beam with respect to its beam gain.

Since the first beam in the first direction being a first threshold stronger than the signal strength on the second beam(s), is suppressed when the signal strength on the second beam(s) is enough strong, i.e. is above the second threshold, the throughput of the MIMO channel will be increased. This is since the channel rank typically increases and more streams can be transmitted.

BRIEF DESCRIPTION OF THE DRAWINGS

Examples of embodiments herein are described in more detail with reference to attached drawings in which:

FIGS. 5 a, b are a schematic block diagrams illustrating embodiments of a radio node.

DETAILED DESCRIPTION

As a part of developing embodiments herein the inventors have identified a problem of prior art which first will be discussed.

Figure 1:
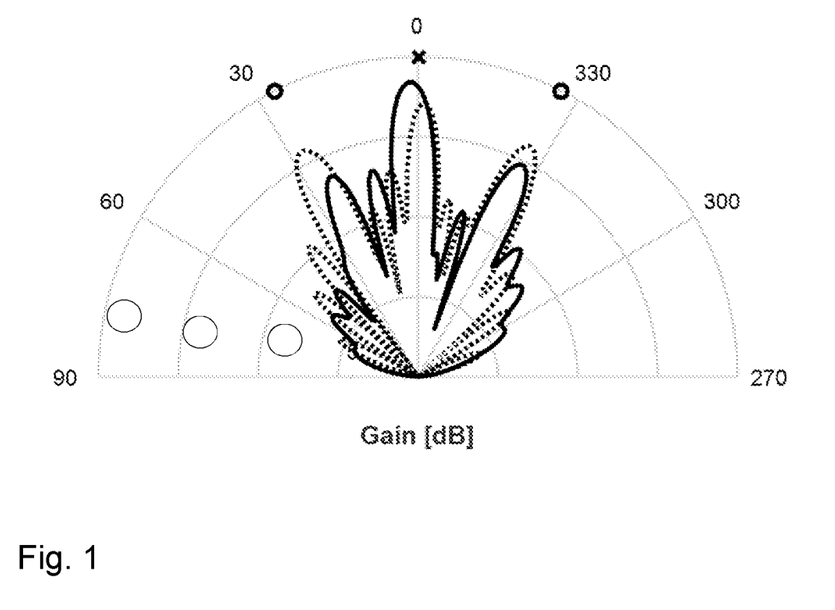
FIG. 1 is a diagram illustrating prior art.

FIG. 1 illustrates an example of beam steering according to prior art. The example is only two dimensional with beam steering in only one dimension which is a horizontal dimension. Only one polarization is illustrated. Distance measures are in wavelengths but some distances are also given in meters within brackets assuming 28 GHz carrier frequency.

The transmission point has a linear antenna array with 16 antennas separated with half wavelength.

Each antenna element has 90 degree half power beam width. The receiver terminal, such as a UE has two Omni directional antennas separated with five wavelengths (54 millimeters (mm)) enabling two layer spatial multiplexing, also referred to as rank-2. Rank-2 means two layers.

The receiver terminal is located at 10 000 wavelengths (107 meters (m)) distance in boresight of the antenna grid, that is 0 degrees in FIG. 1. Antenna boresight is the optical axis of a directional antenna. There is a LoS path in boresight at 0 degrees, x in FIG. 1, and two reflection paths at +/−27 degrees, o in FIG. 1.

The reflection paths are 20 dB weaker than the LoS path.

The two spatial multiplexed streams propagating in the two reflection paths by the SVD beamforming is shown in FIG. 1.

In FIG. 1, all three paths are utilized with largest antenna gain at the LoS path. The Singular Value Ratio (SVR) is 20 dB which is rather poor layer orthogonality for rank-2 transmission. SVR when used in this document is a ratio between two singular values each representing a layer.

Examples of embodiments herein refer to angle spread adaptation.

Some embodiments of this disclosure relate to a per path beam weight at a transmitter in a radio node being optimized for throughput e.g. by taking channel rank and noise level into account. A beam weight when used herein means the set of phase and amplitude values applied to each of the elements in the antenna array to create the desired beam. A rank when used herein means the number of layers of the MIMO channel that can be used for transmission.

A beam in the direction of relative a strong paths such as e.g. LoS, is suppressed to improve MIMO channel conditions when alternative sufficiently strong paths in other beam directions exist. It may e.g. be to not transmit in the strongest beam direction with an analog beamforming radio node such as a UE.

A MIMO channel when used herein means a matrix of the channels between all transmit antennas and all receive antennas.

An advantage of embodiments herein is that MIMO channel conditions are improved to the extent that the throughput of the MIMO channel is increased.

A further advantage of embodiments herein is that a higher rank in LoS is provided.

A further advantage of embodiments herein is that they are feasible for a UE transmit beamforming.

A further advantage of embodiments herein is that no probing test transmission is required.

Figure 2:
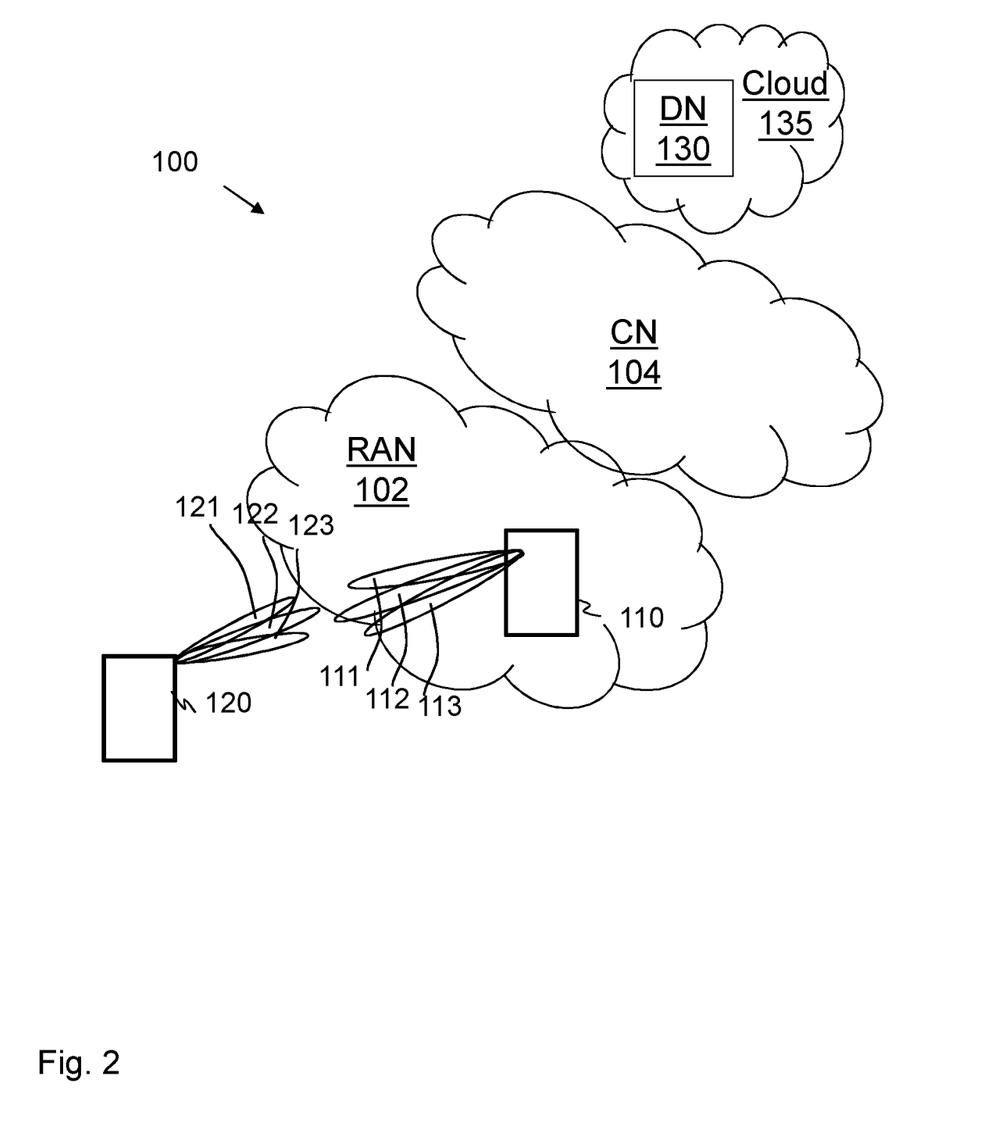
FIG. 2 is a schematic block diagram illustrating embodiments of a wireless communications network.

FIG. 2 is a schematic overview depicting a wireless communications network 100 wherein embodiments herein may be implemented. The wireless communications network 100 comprises one or more RANs 102 and one or more CNs 104. The wireless communications network 100 may use 5G NR and beyond but may further use a number of other different technologies, such as, (LTE), LTE-Advanced, Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations.

Multiple Radio network nodes operate in the wireless communications network 100, whereof only two radio nodes are depicted in FIG. 2, a first radio node 110, and a second radio node 120 providing radio coverage by means of antenna beams, referred to as beams herein. The first radio node 110 and second radio node 120 each comprises a respective transmitter and receiver and are capable to communicate with each other over an air interface.

The first radio node 110 is configured to transmit multiple beams such as e.g. a first beam, 111, and one or more second beams 112, 113 and may use these beams for communicating with e.g. the second radio node 120 for providing radio access to the wireless communications network 100 and further to e.g. the Internet.

The first radio node 110 may be a base station providing radio coverage over a geographical area by means of antenna beams. The geographical area may be referred to as a cell, a service area, beam or a group of beams. The first radio node 110 may in this case be a transmission and reception point e.g. a radio access network node such as a base station, e.g. a radio base station such as a NodeB, an evolved Node B (eNB, eNode B), an NR Node B (gNB), a base transceiver station, a radio remote unit, an Access Point Base Station, a base station router, a transmission arrangement of a radio base station, a stand-alone access point, a Wireless Local Area Network (WLAN) access point, an Access Point Station (AP STA), an access controller, a UE acting as an access point or a peer in a Device to Device (D2D) communication, or any other network unit capable of communicating with a UE within the cell 11 served by first radio node 110 depending e.g. on the radio access technology and terminology used.

The second radio node 120 also comprises multiple beams such as e.g. a first beam, 121, and one or more second beams 122, 123 and may use these beams for communicating with e.g. the first radio node 110 e.g. for radio access to the wireless communications network 100 and further to e.g. the Internet.

The second radio node 120 may be a UE such as e.g. an NR device, a mobile station, a wireless terminal, an NB-IoT device, an eMTC device, a CAT-M device, a WiFi device, an LTE device and an a non-access point (non-AP) STA, a STA, that communicates via a base station such as e.g. the first radio node 110, one or more Access Networks (AN), e.g. RAN, to one or more CNs. For side links, the UE may communicates with another UE. In that case the "intermediate" UE serves as coverage extension of the wireless network. It should be understood by the skilled in the art that the second radio node relates to a non-limiting term which means any UE, terminal, wireless communication terminal, user equipment, (D2D) terminal, or node e.g. smart phone, laptop, mobile phone, sensor, relay, mobile tablets or even a small base station communicating within a cell.

Methods herein may be performed by both the first radio node 110 and the second radio node 120 which both are capable of performing beamforming. Therefore the wording radio node 110, 120 comprising any one or more out of the first radio node 110 and the second radio node 120 is used for the radio node the method.

The methods according to embodiments herein are performed by the radio node 110, 120.

As an alternative, a Distributed Node (DN) 130 and functionality, e.g. comprised in a cloud 135 as shown in FIG. 2 may be used for performing or partly performing the methods.

Figure 3:
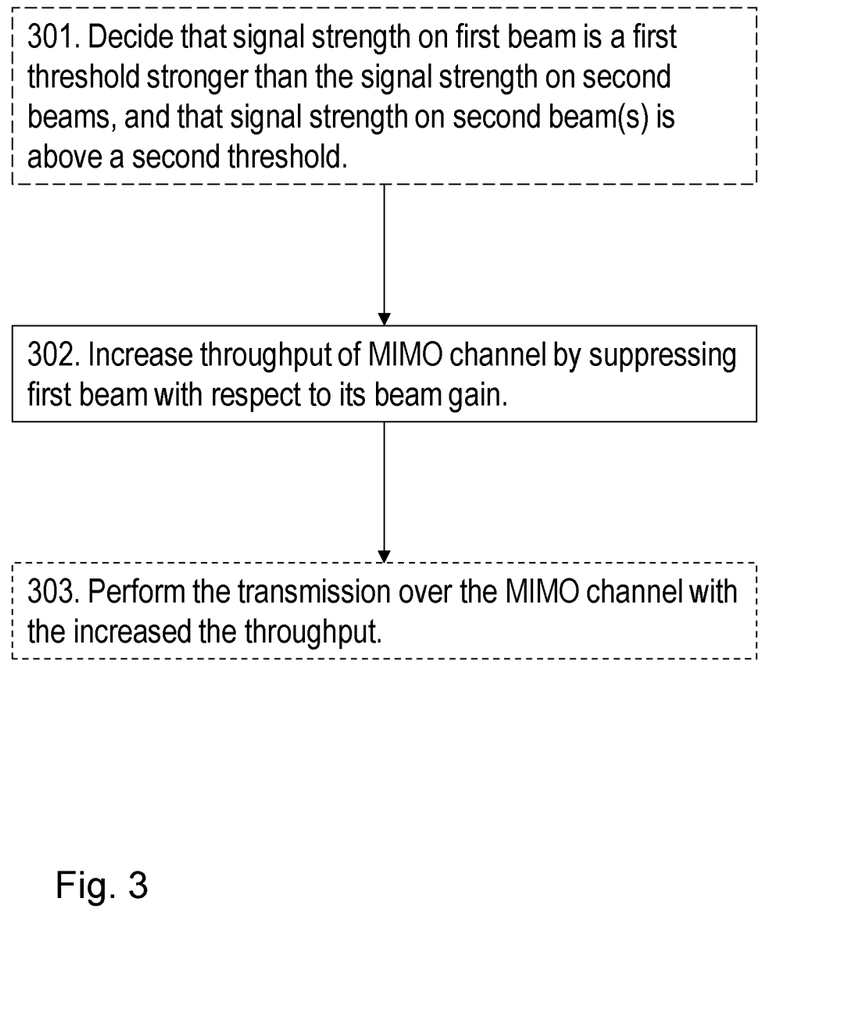
FIG. 3 is a flowchart depicting embodiments of a method in a radio node.

Example embodiments of a method performed by a radio node 110, 120 for increasing a throughput of a MIMO channel, will now be described with reference to a flowchart depicted in FIG. 3. The MIMO channel may comprise a beam gain. In some embodiments herein it is the product of the MIMO channel and the angle dependent beam gain that is considered. As mentioned above, the radio node 110, 120 operates in the wireless communication network 100. Beams are beamformed at a transmitter of the radio node 110, 120. The beams comprises: A first beam comprising a first beam gain in a first direction, and at least one second beam, wherein each respective at least one second beam comprises a second beam gain in a second direction.

The method comprises the following actions, which actions may be taken in any suitable order. Actions that are optional are presented in dashed boxes in FIG. 3.

Action 301

According to an example scenario, the radio node 110, 120 receives the MIMO channel. The radio node 110, 120 is about to transmit over the MIMO channel and therefore wishes to increase the throughput of the MIMO channel such as improve the MIMO channel conditions, if possible. For that reason the radio node 110, 120 establishes the signal strength on the first beam and the at least one second beam. The at least one second beam is referred to as the second beam in the below example.

To be able to increase the throughput of the MIMO channel according to embodiment herein, the first beam shall be enough strong and be the strongest beam, over the at least one second beam, i.e. a first threshold stronger than the second beam. Further the signal strength of the second beam must be strong enough, i.e. be stronger than a second threshold. The first beam may e.g. be Line of Sight (LoS).

To find out this, the the radio node 110, 120 may check whether the difference between the signal strength of the first beam and the signal strength of the second beam, is above the first threshold. Further, the the radio node 110, 120 checks whether the signal strength of the second beam, is above the second threshold.

When theses thresholds are fulfilled, the radio node 110, 120 may consequently decide that the signal strength on the first beam is a first threshold stronger than the signal strength on each respective at least one second beam, and the signal strength on the at least one second beam is above a second threshold.

Action 302

When it is decided that the signal strength on the first beam is a first threshold stronger than the signal strength on each respective at least one second beam, and the signal strength on the at least one second beam is above the second threshold, the radio node 110, 120 increases the throughput of the MIMO channel. This is performed by suppressing the first beam with respect to its beam gain. This may be based on any one out of a channel rank of a matrix of the MIMO channel and a quality of the MIMO channel.

A channel rank of a matrix of the MIMO channel means a maximum number of layers possible to transmit over the MIMO channel without decreasing total throughput.

That the suppressing of the first beam with respect to its beam gain is performed based on a channel rank of a matrix of the MIMO channel means that suppressing is performed if the rank is low with the intension of increasing the rank.

That the suppressing of the first beam with respect to its beam gain is performed based on a quality of the MIMO channel means that suppressing is performed when the quality is low, with the intension of increasing the quality. High rank is a measure of a high quality MIMO channel but it is only one way to characterize it.

The suppressing of the first beam may be performed in different ways depending on which kind of beamforming that is used. Some of these are related to as first to third embodiments and will shortly be described here but they will be exemplified and described more in detail further down.

In some first embodiments, the beams are beamformed by using digital beamforming. In these first embodiments the suppressing of the first beam is performed by adjusting precoding matrix weights to reduce the beam gain of the first beam.

In some second embodiments, the beams are beamformed by using reciprocity based beamforming. In these second embodiments the suppressing of the first beam is performed by adjusting an estimated beam gain.

In some third embodiments, the beams are beamformed by using hybrid digital-analog beamforming. In these three embodiments, the suppressing of the first beam is performed by selecting the at least one second beam to be transmitted to avoid the first beam when the difference between the signal strength on the first beam and the signal strength on the second beam is below a fourth threshold.

Action 303

According to the example scenario, the radio node 110, 120 performs its transmission over the MIMO channel with the increased throughput.

Embodiments herein described above, will no further be explained and exemplified.

Beamforming over a MIMO channel according to some embodiments herein is optimized utilizing a best rank and signal strength trade-off. This means that both higher signal strength and higher rank increases throughput. The tradeoff is to reduce signal strength with less loss in throughput than is gained by the higher rank achieved in the process. The per path estimate and corresponding transmitted beam weight and transmitted power are e.g. adjusted to optimize the throughput of the MIMO channel also referred to as increasing the throughput of the MIMO channel. This is e.g. based on that there is a relationship between rank and angle spread. Increased angle spread generally increases the rank, this is since more independent paths are generally available if the channel is spread out in angle.

According to some embodiments herein, beams in direction of strongest paths are not transmitted with highest power and/or gain as with pure Eigen beamforming. In an example only the strongest path, e.g. the LoS direct path of the first beam, is suppressed to reduce the MIMO channel singular value ratio, improving the spatial multiplexing inter-layer isolation. Spatial multiplexing inter-layer isolation, when used herein means that the interference between transmissions on the separate layers is low. This reduction is performed conditioned that the other paths are sufficiently strong, i.e. the signal strength on the at least one second beam is above a second threshold, so that the total user throughput of the MIMO channel is increased.

For an example wherein digital beamforming is used, such as in the first embodiments, the precoding weights may be adjusted to reduce beam gain in direction of the stronger paths such as the first beam.

With reciprocity based beamforming such as in the second embodiments, the reduction of beam gain in direction of the stronger paths may be achieved by adjusting the estimated path strength.

With hybrid digital-analog beamforming such as in the third embodiments the beams transmitted can be selected to avoid the strongest path when sufficiently strong alternative beams exist with less difference in path strength.

Digital Beamforming, First Embodiments

The first embodiments may comprise the following:

1) The radio node 110, 120 first does an SVD of the received MIMO channel to get singular values and V array. A V array is a right-singular vector of the MIMO channel matrix with the same number of elements as the number of transmit antennas.

2) If the strongest singular value and the Singular Value Ratio (SVR) both are above respectively threshold (these thresholds identifies the possible rank of the channel) go from the antenna domain to the beam domain by performing an Inverse Discrete Fourier Transform (IDFT) of the channel estimate over the antennas providing the beams. Perform a), which is the simplest, or b) below.

a) The radio node 110, 120 will suppress the first beam by nulling the strongest received direction relating to the first beam and do an alternative SVD.

b) The radio node 110, 120 will suppress the strongest direction relating to the first beam, and do an alternative SVD. The amount of suppression will be a trade-off between maintaining a strong signal and good SVR values. The suppression may be nulling the direction if the signal strength of the first beam is good enough on the other directions. I.e. is a first threshold stronger than the at least one second beam.

Then the radio node 110, 120 performs a Discrete Fourier Transform (DFT) of the result back to a modified channel representation in the antenna domain. The radio node 110, 120 then does an SVD of the modified MIMO channel to get singular values and V array.

3) The radio node 110, 120 may then use the SVD alternative with any one or more out of a. and b. below:

a. The lowest SVR, e.g. MIMO channel conditions.

b. A sufficient strongest singular value, e.g. signal strength.

A throughput estimation may be used for both alternatives estimating rank based on SVR and MCS based on singular value to see which one to use.

4) The radio node 110, 120 may then transmit with precoder vectors based on the best SVD V-array. This means that the radio node 110, 120 uses the complex values in the V-array as transmit weights for each antenna element.

The method may be applied on different number of spatial multiplexing layers and also take estimated rank into account in throughput estimations. Spatial multiplexing layers when used herein refer to the different layers on which separate streams of information can be transmitted simultaneously.

Figure 4:
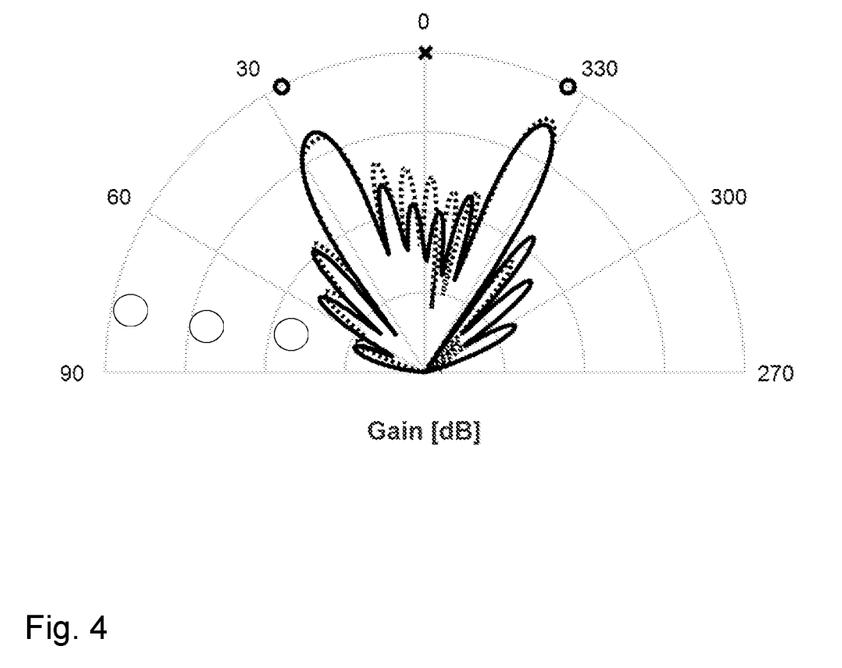
FIG. 4 is a diagram illustrating embodiments herein.

FIG. 4 illustrates an adjusted SVD beamforming according to an example, wherein the strongest beam has been suppressed according to embodiments herein. FIG. 4 illustrates the difference in beamforming towards the prior art example shown in FIG. 1. FIG. 1 illustrates the beamforming before suppressing the strongest beam, and FIG. 4 illustrates the beamforming after suppressing the strongest beam.

As in FIG. 1, FIG. 4 illustrates a two dimensional example with beam steering in only one dimension which is a horizontal dimension. Only one polarization is illustrated. Distance measures are in wavelengths but some distances are also given in meters within brackets assuming 28 GHz carrier frequency.

The transmission point has a linear antenna array with 16 antennas separated with half wavelength.

Each antenna element has 90 degree half power beam width. The receiver terminal, such as a UE, has two Omni directional antennas separated with five wavelengths (54 millimeters (mm)) enabling two layer spatial multiplexing, also referred to as rank-2. Rank-25 2 means two layers.

The receiver radio node is located at 10 000 wavelengths (107 meters (m)) distance in boresight of the antenna grid, that is 0 degrees in FIG. 4. In FIG. 4 there is no LoS path in boresight at 0 degrees, x.

The strongest received path is suppressed by nulling the first beam and SVD is applied on the remaining MIMO channel comprising beam gains from the two second beams. Nulling is selected here as an example, suppression may also be used as have been described above. The LoS path is not utilized for transmission and the gain is instead moved to the two reflection paths.

As a result of the suppressing of the first beam according to embodiments herein, the SVR is reduced to 0.3 dB which is a very good balanced MIMO channel enabling efficient rank-2 transmission. Further, the received power of the second beams is significantly reduced with 20 dB. When the received power of the second beams is strong enough, i.e. the signal strength on the two second beams are above the second threshold, the MIMO channel will have capacity for higher throughput utilizing rank-2 than with the original SVD beamforming. Consequently the suppressing of the first beam results in great advantages compared to the prior art example of FIG. 1.

Reciprocity Based Beamforming, Second Embodiments

When using Reciprocity based beamforming, the decision to suppress may be based on channel measurements on the reverse link where the direction of both stronger and weaker paths can be detected. The principle of reciprocity makes the measurements valid also for the transmit direction.

Hybrid Digital-Analog Beamforming, Third Embodiments

In the third embodiments, the first beam is suppressed by not using the strongest path and beam direction, or the power of the strongest path and beam direction is reduced if other beams, i.e. the at least one second beam, exist that are sufficiently strong, i.e. the signal strength on the at least one second beam is above the second threshold. For example, the radio node 110, 120 excludes the strongest beam which is the first beam in this example. This may be performed by excluding the strongest beam from beams available for being selected. The number of strong paths is not relevant.

It should be noted that the term rank is used when describing embodiments herein and that the embodiments herein may change rank, this is for simplicity. In reality the same mechanism will work within a given rank too; by this it is meant that the layer separation will increase. This increased layer separation may result in that higher MCSs may be used which means higher throughput.

Figure 5A:
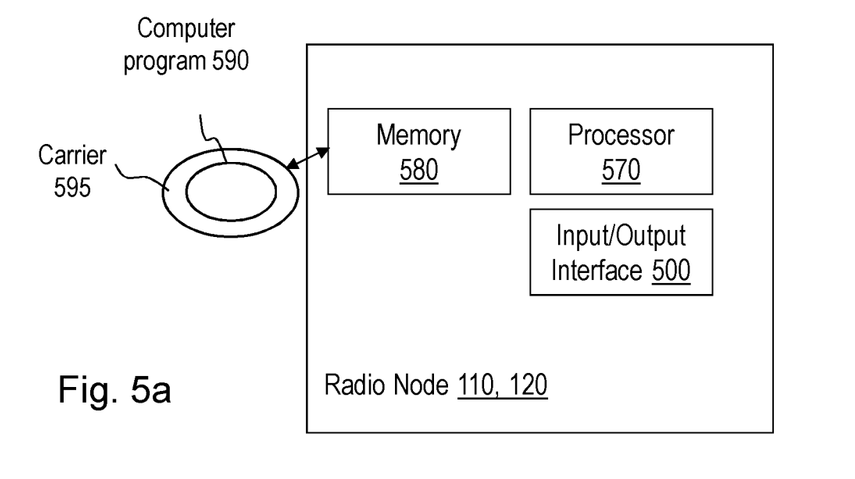
Figure 5B:
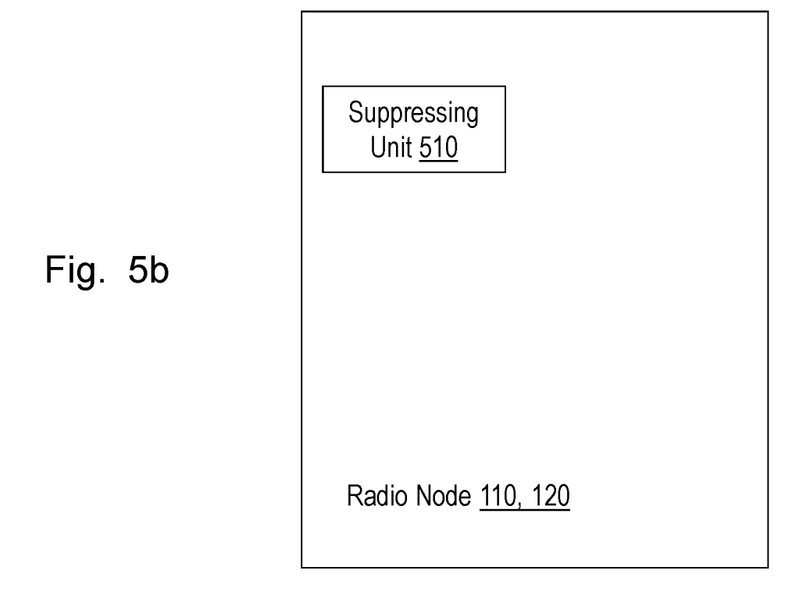

To perform the method actions above for increasing a throughput of a MIMO channel, the radio node 110, 120 may comprise the arrangement depicted in FIGS. 5*a* and 5*b*. As mentioned above, the radio node 110, 120 is operable in the wireless communication network 100 and the beams are to be beamformed at a transmitter of the radio node 110, 120. Furthermore, the beams are adapted to comprise a first beam adapted to comprise a first beam gain in a first direction, and at least one second beam, wherein each respective at least one second beam is adapted to comprises a second beam gain in a second direction.

The radio node 110, 120 may comprise an input and output interface 500 configured to communicate e.g. with the radio node 120, 110. I.e. The radio node 110 may comprise an input and output interface 500 configured to communicate e.g. with the radio node 120 and the radio node 120 may comprise an input and output interface 500 configured to communicate e.g. with the radio node 110. The input and output interface 1200 may comprise a wireless receiver (not shown) and a wireless transmitter (not shown).

The radio node 110, 120 is configured to, e.g. by means of a suppressing unit 510 in the radio node 110, 120, when decided that the signal strength on the first beam is a first threshold stronger than the signal strength on each respective at least one second beam, and the signal strength on the at least one second beam is above a second threshold, increase the throughput of the MIMO channel by suppressing the first beam with respect to its beam gain.

The radio node 110, 120, may further be configured to, e.g. by means of the suppressing unit 510 in the radio node 110, 120, increase the throughput of the MIMO channel by suppressing the first beam with respect to its beam gain by basing it on a channel rank of a matrix of the MIMO channel and a quality of the MIMO channel.

The beams may be adapted to be beamformed by using digital beamforming. The radio node 110, 120, may then further be configured to, e.g. by means of the suppressing unit 510 in the radio node 110, 120, suppress the first beam by adjusting precoding matrix weights to reduce the beam gain of the first beam.

The beams may be adapted to be beamformed by using reciprocity based beamforming. The radio node 110, 120 may then further be configured to, e.g. by means of the suppressing unit 510 in the radio node 110, 120, suppress the first beam by adjusting an estimated beam gain.

The beams may be adapted to be beamformed by using hybrid digital-analog beamforming. The radio node 110, 120 may then further be configured to, e.g. by means of the suppressing unit 510 in the radio node 110, 120, suppress the first beam by selecting the at least one second beam to be transmitted, to avoid the first beam when the difference between the signal strength on the first beam and the signal strength on the second beam is below a fourth threshold.

The embodiments herein may be implemented through a respective processor or one or more processors, such as a processor 570 of a processing circuitry in the radio node 110, 120 depicted in FIG. 5*a*, together with a respective computer program code for performing the functions and actions of the embodiments herein. The program code mentioned above may also be provided as a computer program product, for instance in the form of a data carrier carrying computer program code for performing the embodiments herein when being loaded into the radio node 110, 120. One such carrier may be in the form of a CD ROM disc. It is however feasible with other data carriers such as a memory stick. The computer program code may furthermore be provided as pure program code on a server and downloaded to radio node 110, 120.

The radio node 110, 120 may further comprise a memory 580 comprising one or more memory units. The memory comprises instructions executable by the processor 570. The memory 580 is arranged to be used to store e.g. information about beam gain, beam direction, signal strength, first and second thresholds, data and applications to perform the methods herein when being executed in the radio node 110, 120.

Those skilled in the art will also appreciate that the units in the radio node 110, 120 mentioned above may refer to a combination of analog and digital circuits, and/or one or more processors configured with software and/or firmware, e.g. stored in the radio node 110, 120 that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

In some embodiments, a computer program 590 comprises instructions, which when executed by the respective at least one processor 570, cause the at least one processor 570 of the radio node 110, 120 to perform the actions above.

In some embodiments, a carrier 595 comprises the computer program 590, wherein the carrier 595 is one of an electronic signal, an optical signal, an electromagnetic signal, a magnetic signal, an electric signal, a radio signal, a microwave signal, or a computer-readable storage medium.

Further Extensions and Variations

Figure 6:
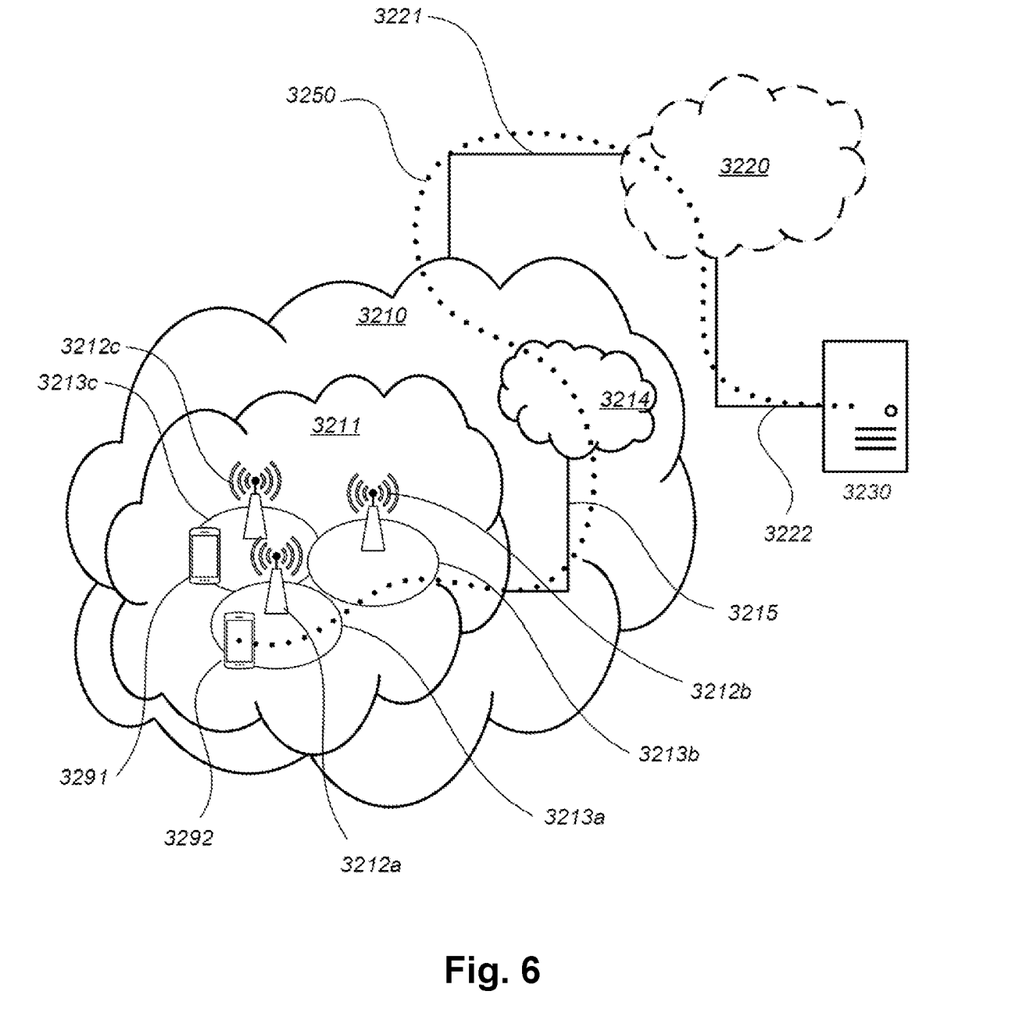
FIG. 6 schematically illustrates a telecommunication network connected via an intermediate network to a host computer.

With reference to FIG. 6, in accordance with an embodiment, a communication system includes a telecommunication network 3210 such as the wireless communications network 100, e.g. a NR network, such as a 3GPP-type cellular network, which comprises an access network 3211, such as a radio access network, and a core network 3214. The access network 3211 comprises a plurality of base stations 3212*a*, 3212*b*, 3212*c*, such as the radio node 110, access network nodes, AP STAs NBs, eNBs, gNBs or other types of wireless access points, each defining a corresponding coverage area 3213*a*, 3213*b*, 3213*c*. Each base station 3212*a*, 3212*b*, 3212*c* is connectable to the core network 3214 over a wired or wireless connection 3215. A first user equipment (UE) e.g. the radio node 120 such as a Non-AP STA 3291 located in coverage area 3213*c* is configured to wirelessly connect to, or be paged by, the corresponding base station 3212*c*. A second UE 3292 e.g. the first or second radio node 110, 120 or such as a Non-AP STA in coverage area 3213*a* is wirelessly connectable to the corresponding base station 3212*a*. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 6 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 7. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 7) served by the base station 3320. The communication interface 3326 may be configured to facilitate a connection 3360 to the host computer 3310. The connection 3360 may be direct or it may pass through a core network (not shown in FIG. 7) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 7:
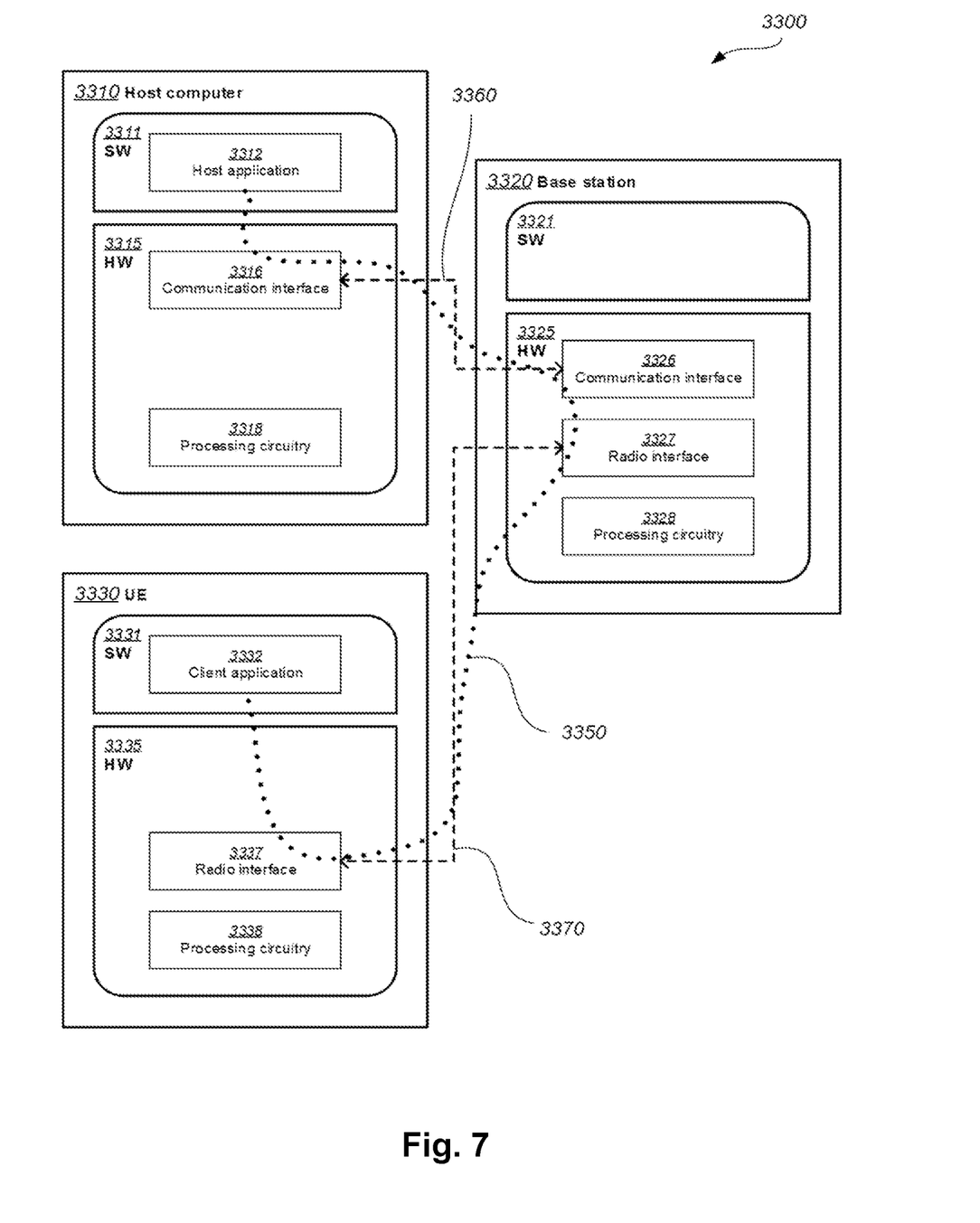
FIG. 7 is a generalized block diagram of a host computer communicating via a base station with a user equipment over a partially wireless connection.

It is noted that the host computer 3310, base station 3320 and UE 3330 illustrated in FIG. 7 may be identical to the host computer 3230, one of the base stations 3212a, 3212b, 3212c and one of the UEs 3291, 3292 of FIG. 6, respectively. This is to say, the inner workings of these entities may be as shown in FIG. 7 and independently, the surrounding network topology may be that of FIG. 6.

In FIG. 7, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the data rate, latency, power consumption and thereby provide benefits such as user waiting time, relaxed restriction on file size, better responsiveness, extended battery lifetime.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

Figure 8:
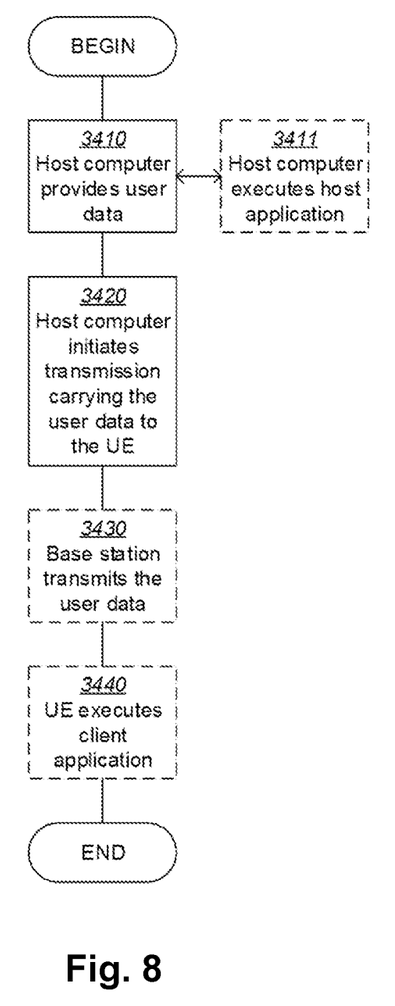
FIGS. 8-11 are flowcharts illustrating methods implemented in a communication system including a host computer, a base station and a user equipment.

FIG. 8 is a flowchart illustrating a method implemented in a communication system, in accordance with one embodiment. The communication system includes a host computer, a base station such as a AP STA, and a UE such as a Non-AP STA which may be those described with reference to FIGS. 32 and 33. For simplicity of the present disclosure, only drawing references to FIG. 8 will be included in this section. In a first action 3410 of the method, the host computer provides user data. In an optional subaction 3411 of the first action 3410, the host computer provides the user data by executing a host application. In a second action 3420, the host computer initiates a transmission carrying the user data to the UE. In an optional third action 3430, the base station transmits to the UE the user data which was carried in the transmission that the host computer initiated, in accordance with the teachings of the embodiments described throughout this disclosure. In an optional fourth action 3440, the UE executes a client application associated with the host application executed by the host computer.

Figure 9:
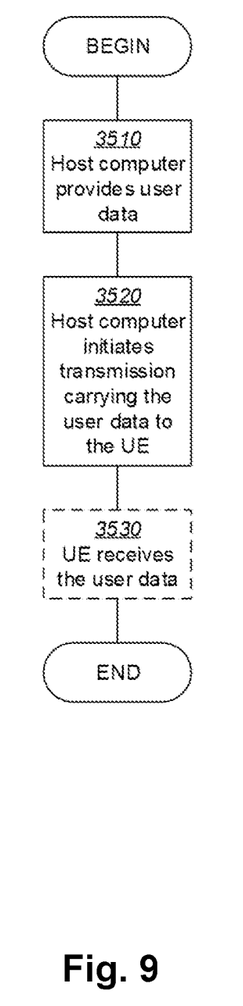

FIG. 9 is a flowchart illustrating a method implemented in a communication system, in accordance with one embodiment. The communication system includes a host computer, a base station such as a AP STA, and a UE such as a Non-AP STA which may be those described with reference to FIGS.

32 and 33. For simplicity of the present disclosure, only drawing references to FIG. 9 will be included in this section. In a first action 3510 of the method, the host computer provides user data. In an optional subaction (not shown) the host computer provides the user data by executing a host application. In a second action 3520, the host computer initiates a transmission carrying the user data to the UE. The transmission may pass via the base station, in accordance with the teachings of the embodiments described throughout this disclosure. In an optional third action 3530, the UE receives the user data carried in the transmission.

Figure 10:
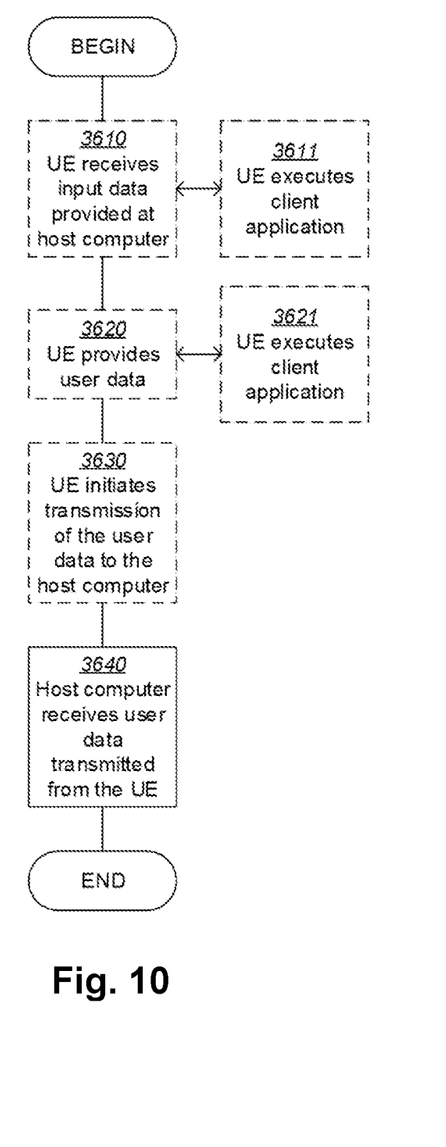

FIG. 10 is a flowchart illustrating a method implemented in a communication system, in accordance with one embodiment. The communication system includes a host computer, a base station such as a AP STA, and a UE such as a Non-AP STA which may be those described with reference to FIGS. 32 and 33. For simplicity of the present disclosure, only drawing references to FIG. 10 will be included in this section. In an optional first action 3610 of the method, the UE receives input data provided by the host computer. Additionally or alternatively, in an optional second action 3620, the UE provides user data. In an optional subaction 3621 of the second action 3620, the UE provides the user data by executing a client application. In a further optional subaction 3611 of the first action 3610, the UE executes a client application which provides the user data in reaction to the received input data provided by the host computer. In providing the user data, the executed client application may further consider user input received from the user. Regardless of the specific manner in which the user data was provided, the UE initiates, in an optional third subaction 3630, transmission of the user data to the host computer. In a fourth action 3640 of the method, the host computer receives the user data transmitted from the UE, in accordance with the teachings of the embodiments described throughout this disclosure.

Figure 11:
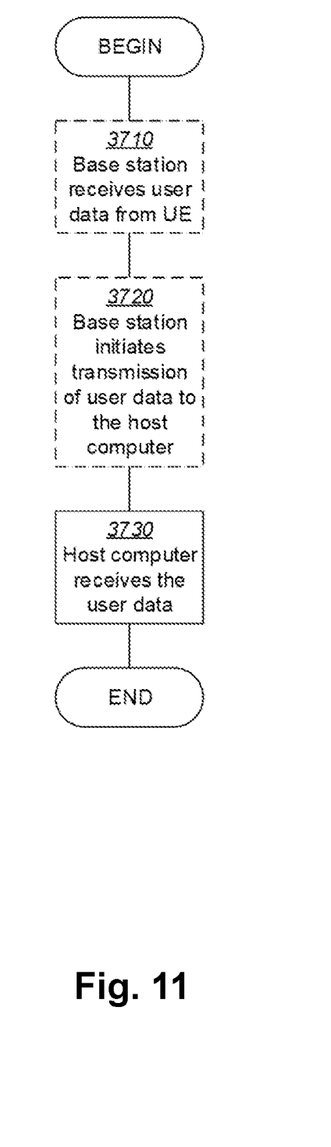

FIG. 11 is a flowchart illustrating a method implemented in a communication system, in accordance with one embodiment. The communication system includes a host computer, a base station such as a AP STA, and a UE such as a Non-AP STA which may be those described with reference to FIGS. 32 and 33. For simplicity of the present disclosure, only drawing references to FIG. 11 will be included in this section. In an optional first action 3710 of the method, in accordance with the teachings of the embodiments described throughout this disclosure, the base station receives user data from the UE. In an optional second action 3720, the base station initiates transmission of the received user data to the host computer. In a third action 3730, the host computer receives the user data carried in the transmission initiated by the base station.

When using the word "comprise" or "comprising" it shall be interpreted as non-limiting, i.e. meaning "consist at least of".

The embodiments herein are not limited to the above described preferred embodiments. Various alternatives, modifications and equivalents may be used.

The invention claimed is:

1. A method performed by a radio node for increasing a throughput of a Multiple-Input Multiple-Output (MIMO) channel, which radio node operates in a wireless communication network, wherein beams are beamformed at a transmitter of the radio node, and wherein the beams comprise: a first beam having a first beam gain in a first direction, and a second beam having a second beam gain in a second direction, the method comprising:

after determining that i) a signal strength on the first beam is a first threshold stronger than a signal strength on the second beam and ii) the signal strength on the second beam is above a second threshold, increasing the throughput of the MIMO channel by suppressing the first beam with respect to its beam gain.

2. The method according to claim 1, wherein increasing the throughput of the MIMO channel by suppressing the first beam with respect to its beam gain is based on any one out of a channel rank of a matrix of the MIMO channel or a quality of the MIMO channel.

3. The method according to claim 1, wherein
the beams are beamformed by using digital beamforming, and
the step of suppressing of the first beam comprises adjusting precoding matrix weights to reduce the first beam gain of the first beam.

4. The method according to claim 1, wherein
the beams are beamformed by using reciprocity based beamforming, and
the suppressing of the first beam is performed by adjusting an estimated beam gain.

5. The method according to claim 1, wherein
the beams are beamformed by using hybrid digital-analog beamforming, and
the suppressing of the first beam is performed by selecting the second beam to be transmitted to avoid the first beam when a difference between the signal strength on the first beam and the signal strength on the second beam is below a fourth threshold.

6. A computer program product comprising a non-transitory computer readable medium storing a computer program comprising instructions, which when executed by a processor, cause the processor to perform the method of claim 1.

7. A radio node for increasing a throughput of a Multiple-Input Multiple-Output (MIMO) channel, which radio node is operable in a wireless communication network, wherein beams are to be beamformed at a transmitter of the radio node, and wherein the beams are adapted to comprise: a first beam adapted to have a first beam gain in a first direction, and a second beam adapted to having a second beam gain in a second direction, the radio node being configured to:
increase the throughput of the MIMO channel after determining that a signal strength on the first beam is a first threshold stronger than a signal strength on the second beam, and the signal strength on the second beam is above a second threshold, wherein the radio node is configured to increase the throughput of the MIMO channel by suppressing the first beam with respect to its beam gain.

8. The radio node according to claim 7, further being configured to increase the throughput of the MIMO channel by suppressing the first beam with respect to its beam gain based on any one out of a channel rank of a matrix of the MIMO channel or a quality of the MIMO channel.

9. The radio node according to claim 7, wherein
the beams are adapted to be beamformed by using digital beamforming, and
the radio node further is configured to suppress the first beam by adjusting precoding matrix weights to reduce the first beam gain of the first beam.

10. The radio node according to claim 7, wherein
the beams are adapted to be beamformed by using reciprocity based beamforming, and
the radio node further is configured to suppress the first beam by adjusting an estimated beam gain.

11. The radio node according to claim 7, wherein
the beams are adapted to be beamformed by using hybrid digital-analog beamforming, and
the radio node further is configured to suppress the first beam by selecting the second beam to be transmitted, to avoid the first beam when a difference between the signal strength on the first beam and the signal strength on the second beam is below a fourth threshold.

\* \* \* \* \*